US012152922B2

(12) United States Patent
Shao et al.

(10) Patent No.: US 12,152,922 B2
(45) Date of Patent: Nov. 26, 2024

(54) METHODS AND INTERNET OF THINGS (IOT) SYSTEMS FOR WARNING ABNORMAL GAS TRANSMISSION LOSS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Guanghua Huang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/607,479

(22) Filed: Mar. 17, 2024

(65) Prior Publication Data

US 2024/0219218 A1    Jul. 4, 2024

Related U.S. Application Data

(63) Continuation of application No. 18/184,650, filed on Mar. 15, 2023, now Pat. No. 11,965,765.

(30) Foreign Application Priority Data

Feb. 13, 2023    (CN) .......................... 202310104479.2

(51) Int. Cl.
*G01F 15/061* (2022.01)
*G16Y 10/35* (2020.01)
(Continued)

(52) U.S. Cl.
CPC ............ *G01F 15/061* (2013.01); *G16Y 10/35* (2020.01); *G16Y 20/10* (2020.01); *G16Y 20/30* (2020.01); *G16Y 40/10* (2020.01)

(58) Field of Classification Search
CPC ............. G05B 23/0283; G05B 13/047; G05B 13/048; G05B 2223/04; G05B 2223/06;
(Continued)

(56) References Cited

U.S. PATENT DOCUMENTS

2019/0257700 A1* 8/2019 Lewis .................... G01K 13/02
2019/0301963 A1* 10/2019 Yoshikawa ............. G01M 3/00
(Continued)

FOREIGN PATENT DOCUMENTS

CN           203116785 U      8/2013
CN           106302683 A      1/2017
(Continued)

OTHER PUBLICATIONS

First Office Action in Chinese Application No. 202310104479.2 mailed on Mar. 16, 2023, 28 pages.
(Continued)

*Primary Examiner* — John Fitzgerald
*Assistant Examiner* — Truong D Phan
(74) *Attorney, Agent, or Firm* — METIS IP LLC

(57) ABSTRACT

Disclosed is a method for warning abnormal gas transmission loss, comprising obtaining gas flow data, gas pressure data, and ambient temperature data of a plurality of time points respectively based on the gas metering devices, the pressure detection devices, and the temperature monitoring devices; determining a gas metering error by processing the ambient temperature data, gas metering device information, and gas information using an error model; determining whether gas loss is abnormal loss based on the gas flow data,
(Continued)

the gas pressure data, and the gas metering error; in response to the gas loss being the abnormal loss, determining a warning level based on a position and a size of the abnormal loss; and determining, based on the warning level, a warning notice corresponding to the warning level, and sending the warning notice to the gas user platform through the gas service platform to send a warning to a user.

15 Claims, 6 Drawing Sheets

(51) Int. Cl.
   *G16Y 20/10* (2020.01)
   *G16Y 20/30* (2020.01)
   *G16Y 40/10* (2020.01)

(58) Field of Classification Search
   CPC .. G05B 13/027; G05B 23/00; G05B 23/0254; G05B 23/0275; G05B 23/0281; G05B 2219/25255; G01K 13/02; G01K 13/026; G01N 11/10; G01N 9/36; G01N 29/02; G01N 27/72; G01N 35/00871; G01N 33/28; G01N 2291/02818; G01L 9/04; G01F 15/061; G16Y 10/35; G16Y 20/10; G16Y 20/30; G16Y 40/10; Y02P 90/02; G06N 3/02; G06N 20/00; G06N 3/0442; G06N 3/0464; G01M 3/00; G01M 3/26; G01M 3/3254; G01M 3/18; G01M 15/048; G01M 15/106; G01M 3/2815
   See application file for complete search history.

(56) References Cited

U.S. PATENT DOCUMENTS

| | | | |
|---|---|---|---|
| 2019/0303791 A1* | 10/2019 | Yoshikawa | G06N 20/00 |
| 2022/0058745 A1* | 2/2022 | Crabtree | G06N 20/00 |
| 2023/0214682 A1* | 7/2023 | Lewis | G06N 7/01 |
| | | | 706/12 |

FOREIGN PATENT DOCUMENTS

| | | |
|---|---|---|
| CN | 109060060 A | 12/2018 |
| CN | 112990680 A | 6/2021 |
| CN | 113033973 A | 6/2021 |
| CN | 113570475 A | 10/2021 |
| CN | 113778685 A | 12/2021 |
| CN | 114398987 A | 4/2022 |
| CN | 115356978 A | 11/2022 |
| CN | 115545967 A | 12/2022 |
| CN | 115631066 A | 1/2023 |

OTHER PUBLICATIONS

Pei, Jingwei, Analysis of measurement error and improvement measures of town gas, Town Construction, 2021, 4 pages.
Tian, Xiaocui et al, Review of Analysis and Control for Gas Loss of Pipeline, Contemporary Chemical Industry, 43 (7): 1322-1325, 2014.
Nie, Qun et al., Control of Natural Gas Transmission Loss, Oil and Gas Field Surface Engineering, 2007, 6 pages.
Fang, Linquan, Discussion on the Significance of Gas Transmission Difference Control to Gas Companies, coal, 2012, 3 pages.

* cited by examiner

METHODS AND INTERNET OF THINGS (IOT) SYSTEMS FOR WARNING ABNORMAL GAS TRANSMISSION LOSS

CROSS-REFERENCE TO RELATED APPLICATION

This application is a continuation of U.S. application Ser. No. 18/184,650, field on Mar. 15, 2023, which claims priority of Chinese Application No. 202310104479.2, filed on Feb. 13, 2023, the entire contents of each of which are hereby incorporated by reference.

TECHNICAL FIELD

The present disclosure relates to the technical field of gas transmission, and in particular, to methods and Internet of Things (IoT) systems for warning abnormal gas transmission loss.

BACKGROUND

In the current social development, the process of urbanization is accelerating, and gas has become an indispensable and important basic energy source in people's lives. With the promotion and popularization of gas throughout the country, a large number of long-distance gas pipelines and urban gas distribution pipelines have been built, and more and more attention is paid to the loss of gas during pipeline transmission. For a gas metering mode, in most areas of China, a total amount is calculated according to the consumption of local users. Looking at the actual situation of gas metering, gas metering errors are always large. This situation is mainly caused by gas pressure and air flow fluctuations, wide range metering errors, differences in supply conditions, gas quality, etc., which is very adverse to the accuracy of gas metering. Thus it is difficult to accurately determine the actual loss in the process of gas transmission.

Therefore, it is desirable to provide methods and Internet of Things (IoT) systems for warning abnormal gas transmission loss to improve the accuracy of gas loss prediction during the process of gas transmission.

SUMMARY

One or more embodiments of the present disclosure provide a method for warning abnormal gas transmission loss, implemented by a gas equipment management platform of an Internet of Things (IoT) system for warning abnormal gas transmission loss. The IoT system for warning the abnormal gas transmission loss may comprise a gas user platform, a gas service platform, a gas sensor network platform, and a gas object platform. The gas object platform may be configured as at least one of gas metering devices, pressure detection devices, and temperature monitoring devices. The method may comprise: obtaining gas flow data, gas pressure data, and ambient temperature data of a plurality of time points respectively through the gas sensor network platform based on the gas metering devices, the pressure detection devices, and the temperature monitoring devices at a plurality of positions of a gas pipeline network; determining a gas metering error by processing the ambient temperature data, gas metering device information, and gas information using an error model, wherein the error model may be a trained machine learning model, the error model may include a temperature feature extraction layer and a prediction layer, the temperature feature extraction layer may be configured to determine a temperature change feature by processing the ambient temperature data, the prediction layer may be configured to determine the gas metering error by processing the temperature change feature, the gas metering device information, and the gas information, the temperature feature extraction layer may be one of recurrent neural networks (RNN) and long short-term memory networks (LSTM), and the prediction layer may be one of the RNN, convolutional neural networks (CNN), or other custom networks; determining whether gas loss is abnormal loss based on the gas flow data, the gas pressure data, and the gas metering error; in response to a determination that the gas loss is the abnormal loss, determining a warning level based on a position and a size of the abnormal loss; and determining, based on the warning level, a warning notice corresponding to the warning level, and sending the warning notice to the gas user platform through the gas service platform to send a warning to a user.

One or more embodiments of the present disclosure provide an Internet of Things (IoT) system for warning abnormal gas transmission loss, comprising a gas equipment management platform, a gas user platform, a gas service platform, a gas sensor network platform, and a gas object platform. The gas object platform may be configured as at least one of gas metering devices, pressure detection devices, and temperature monitoring devices. The gas equipment management platform may be configured to: obtain gas flow data, gas pressure data, and ambient temperature data of a plurality of time points respectively through the gas sensor network platform based on the gas metering devices, the pressure detection devices, and the temperature monitoring devices at a plurality of positions of a gas pipeline network; determine a gas metering error by processing the ambient temperature data, gas metering device information, and gas information using an error model, wherein the error model may be a trained machine learning model, the error model may include a temperature feature extraction layer and a prediction layer, the temperature feature extraction layer may be configured to determine a temperature change feature by processing the ambient temperature data, the prediction layer may be configured to determine the gas metering error by processing the temperature change feature, the gas metering device information, and the gas information, the temperature feature extraction layer may be one of recurrent neural networks (RNN) and long short-term memory networks (LSTM), and the prediction layer may be one of the RNN, convolutional neural networks (CNN), or other custom networks; determine whether gas loss is abnormal loss based on the gas flow data, the gas pressure data, and the gas metering error; in response to a determination that the gas loss is the abnormal loss, determine a warning level based on a position and a size of the abnormal loss; and determine, based on the warning level, a warning notice corresponding to the warning level, and send the warning notice to the gas user platform through the gas service platform to send a warning to a user.

One or more embodiments of the present disclosure provide a non-transitory computer-readable storage medium storing computer instructions. When reading the computer instructions in the storage medium, a computer may execute the method for warning the abnormal gas transmission loss of the embodiments.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
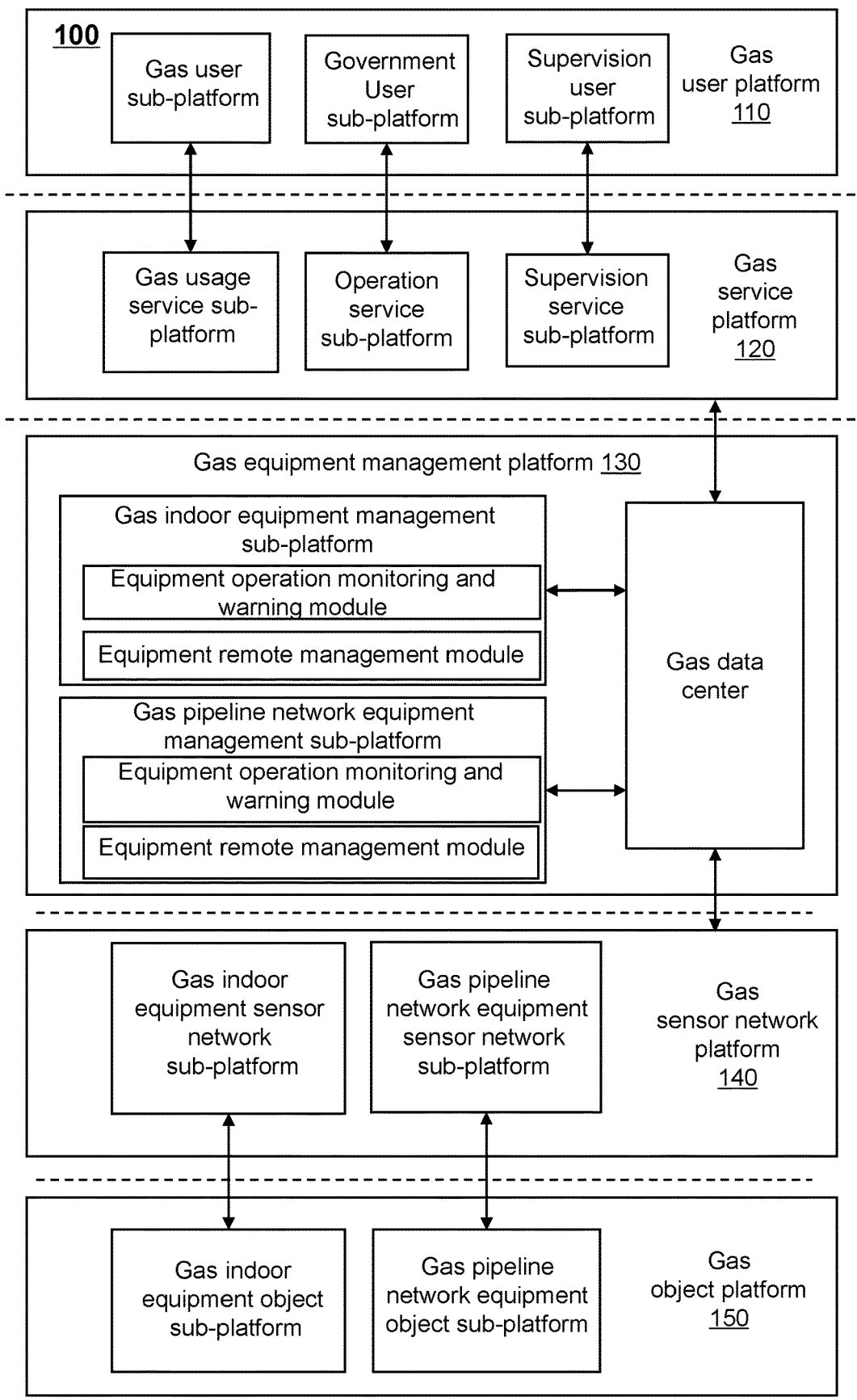
FIG. 1 is a platform structure diagram illustrating an exemplary Internet of Things (IoT) system for warning abnormal gas transmission loss according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a platform structure diagram illustrating an exemplary Internet of Things (IoT) system for warning abnormal gas transmission loss according to some embodiments of the present disclosure. In some embodiments, the IoT system 100 for warning the abnormal gas transmission loss may include a gas user platform 110, a gas service platform 120, a gas equipment management platform 130, a gas sensor network platform 140, and a gas object platform 150.

The gas user platform 110 may be a user-oriented service interface. In some embodiments, the gas user platform may include a plurality of gas user sub-platforms, such as a gas user sub-platform, a government user sub-platform, and a supervision user sub-platform. A gas user may refer to a gas consumer, a government user may refer to a government department person who dispatches and operates gas supply, and a supervision user may refer to a relevant person who supervises gas supply and use safety.

In some embodiments, the gas user platform 110 may receive information from the user and/or the gas service platform 120. For example, the gas user platform 110 may receive a gas equipment parameter management information query instruction input by the user, such as a gas usage data query instruction, and feedback on gas usage issues input by the gas user; a gas operation data query instruction input by the government user; and a data query instruction related to supervision input by the supervision user. The gas equipment parameter management information may include but is not limited to gas flow data, gas pressure data, ambient temperature data, a gas loss amount, whether the gas loss is abnormal, etc. As another example, the gas user platform 110 may receive information fed back to the user from the gas service platform 120, such as a warning notice of abnormal gas loss.

In some embodiments, the gas user platform 110 may be configured to feed back the received information to the user. In some embodiments, the gas user platform 110 may be configured to send data and/or an instruction to the gas service platform 120, for example, to send an instruction to determine whether the gas loss is abnormal loss.

The gas service platform 120 may be a platform for preliminary processing of information. In some embodiments, the gas service platform 120 may be configured to perform information and/or data interaction with the gas user platform 110 and the gas equipment management platform 130. For example, the gas service platform 120 may obtain the gas equipment parameter management information query instruction input by the user from the gas user platform 110, upload the gas equipment parameter management information to the gas user platform 110, etc. As another example, the gas service platform 120 may send the gas equipment parameter management information query instruction to the gas equipment management platform 130, and obtain abnormal gas transmission loss prediction information (e.g., whether the gas loss is the abnormal loss, the warning notice, etc.) from the gas equipment management platform 130.

In some embodiments, the gas service platform 120 may include a plurality of gas service sub-platforms, such as a gas usage service sub-platform, a operation service sub-platform, and a supervision service sub-platform. The different gas service sub-platforms may correspond to the different gas user sub-platforms. For example, the gas usage service sub-platform may correspond to a gas user sub-platform, the operation service sub-platform may correspond to a government user sub-platform, and the supervision service sub-platform may correspond to a supervision user sub-platform.

In some embodiments, at least one of the plurality of gas service sub-platforms may send a query instruction to query the corresponding gas equipment parameter management information to the gas device management platform 130 to obtain the corresponding information. For example, the at least one of the plurality of gas service sub-platforms may send the gas equipment parameter management information query instruction to a gas data center in the gas equipment management platform 130, and receive the gas equipment parameter management information uploaded by the gas data center in the gas equipment management platform 130.

In some embodiments, the at least one of the plurality of gas service sub-platforms may receive the gas equipment parameter management information query instruction sent by the corresponding gas user sub-platform, and upload the corresponding gas equipment parameter management information to the gas user sub-platform. For example, the operation service sub-platform may receive the gas equipment parameter management information query instruction sent by the government user sub-platform, and upload the corresponding gas equipment parameter management information to the government user sub-platform.

The gas equipment management platform 130 may refer to an IoT platform that overall-plans and coordinates the connection and collaboration between various functional platforms, and provides perception management and control management. In some embodiments, the gas equipment management platform 130 may be configured to predict a gas metering error based on the ambient temperature data; determine whether the gas loss is abnormal loss based on the gas flow data, the gas pressure data and the gas metering error; in response to a determination that the gas loss is the abnormal loss, send a warning notice; and transmit the warning notice to the gas user platform 110 through the gas service platform 120 based on the gas data center. In some embodiments, the user may obtain the warning notice through the user platform 110, and make corresponding processing based on the warning notice.

For further description about determining whether the gas loss is the abnormal loss, and in response to a determination that the gas loss is the abnormal loss, sending the warning notice, please refer to FIG. 2, FIG. 3, FIG. 4, FIG. 5, and FIG. 6 and related description thereof.

In some embodiments, the gas equipment management platform 130 may include a gas indoor equipment management sub-platform, a gas pipeline network equipment management sub-platform, and a gas data center. Each gas management sub-platform may be set independently of each other, and may perform data interaction with the gas data center. For example, each gas management sub-platform may obtain and process data uploaded by the gas sensor network platform 140 from the gas data center, and then feedback a processing result to the gas data center.

In some embodiments, the gas equipment management platform 130 may perform information and/or data interaction with the gas service platform 120 and the gas sensor network platform 140 through the gas data center. For example, the gas data center may obtain the gas equipment parameter management information obtained by the gas sensor network platform 140, upload the data processing result fed back by each gas equipment management sub-platform to the gas service platform 120, etc. In some embodiments, the gas data center may summarize and store the gas equipment parameter management information. For example, the gas data center may classify, summarize and store the data uploaded by the gas sensor network platform 140. As another example, the gas data center may classify, summarize and store the data processing result fed back by each gas equipment management sub-platform.

In some embodiments, the gas indoor equipment management sub-platform and the gas pipeline network equipment management sub-platform may include an equipment operation monitoring and warning module and an equipment remote management module. The equipment operation monitoring and warning module may be configured to view historical data and real-time data of indoor and/or pipeline network equipment operation parameters, and perform monitoring and warning according to a preset threshold. The equipment remote management module may remotely set and adjust the parameters of gas object platform equipment of the gas indoor and/or pipeline network, and remotely authorize on-site equipment parameter adjustment initiated by the gas object platform equipment of the gas indoor and/or pipeline network.

The gas sensor network platform 140 may be a connection platform for implementing interaction between the gas equipment management platform 130 and the gas object platform 150. In some embodiments, the gas sensor network platform 140 may receive an instruction for obtaining the gas equipment parameter management information sent by the gas equipment management platform 130 through the gas data center, and send the instruction to the gas object platform 150. In some embodiments, the gas sensor network platform 140 may be configured to receive the gas equipment parameter management information from the gas object platform 150, and upload the received gas equipment parameter management information to the gas data center of the gas equipment management platform 130.

In some embodiments, the gas sensor network platform 140 may include a gas indoor equipment sensor network sub-platform and a gas pipeline network equipment sensor network sub-platform. In some embodiments, each gas sensor network sub-platform may be in one-to-one correspondence with each gas equipment management sub-platform, and may be in one-to-one correspondence with each gas object sub-platform.

In some embodiments, each gas sensor network sub-platform may perform information and/or data interaction with the corresponding gas object sub-platform. For example, each gas sensor network sub-platform may receive the instruction for obtaining the gas equipment parameter management information sent by the gas data center, and send the instruction to the corresponding gas object sub-platform. As another example, each gas sensor network sub-platform may receive the gas equipment parameter management information uploaded by the corresponding gas object sub-platform.

The gas object platform 150 may be a functional platform for generation of perception information and final execution of control information. In some embodiments, the gas object platform 150 may include a gas indoor equipment object sub-platform and a gas pipeline network equipment object sub-platform. The gas indoor equipment object sub-platform may correspond to the gas indoor equipment sensor network sub-platform, and the gas pipeline network equipment object sub-platform may correspond to the gas pipeline network equipment sensor network sub-platform.

In some embodiments, the gas object platform 150 may receive the instruction for obtaining the gas equipment parameter management information sent by the gas sensor network platform 140, and obtain the corresponding gas equipment parameter management information through the corresponding gas object sub-platform. For example, the gas object platform 150 may be configured to obtain the gas flow data, the gas pressure data, and the ambient temperature data based on the instruction, and upload the gas flow data, the gas pressure data, and the ambient temperature data to the gas data center of the gas equipment management platform based on the corresponding gas sensor network sub-platform. In some embodiments, the gas object platform 150 may be configured as various terminal detection equipment (such as gas metering devices, pressure detection devices, and temperature monitoring devices) to obtain the gas equipment parameter management information, for example, the gas flow data of corresponding positions may be obtained based on a plurality of gas metering devices of the gas pipeline network, the gas pressure data of different positions of the gas pipeline network may be obtained based on a plurality of pressure detection devices, and the ambient temperature data of different positions of the gas pipeline network may be obtained based on a plurality of temperature monitoring devices. The gas metering device may include but is not limited to a gas meter, a gas flow meter, etc. The pressure detection device may include but is not limited to a U-shaped press, a millibar pressure gauge, a digital pressure gauge, etc. The temperature monitoring device may include but is not limited to a gas thermometer, a pressure thermometer, a temperature sensor, etc.

It should be noted that the above description of the IoT system for warning the abnormal gas transmission loss and the modules thereof is only for convenience of illustration, and not intended to limit the present disclosure to the scope of the embodiments. It is understood that for those skilled in the art, after understanding the principle of the system, it is possible to combine various modules arbitrarily or form a subsystem to connect with other modules without departing from the principle. In some embodiments, the gas user platform 110, the gas service platform 120, the gas equipment management platform 130, the gas sensor network platform 140, and the gas object platform 150 disclosed in FIG. 1 may be different modules in a system or one module implementing the functions of the two or more modules. For example, each module may share one storage module, and each module may also have its own storage module. Such variations are all within the protection scope of the present disclosure.

Figure 2:
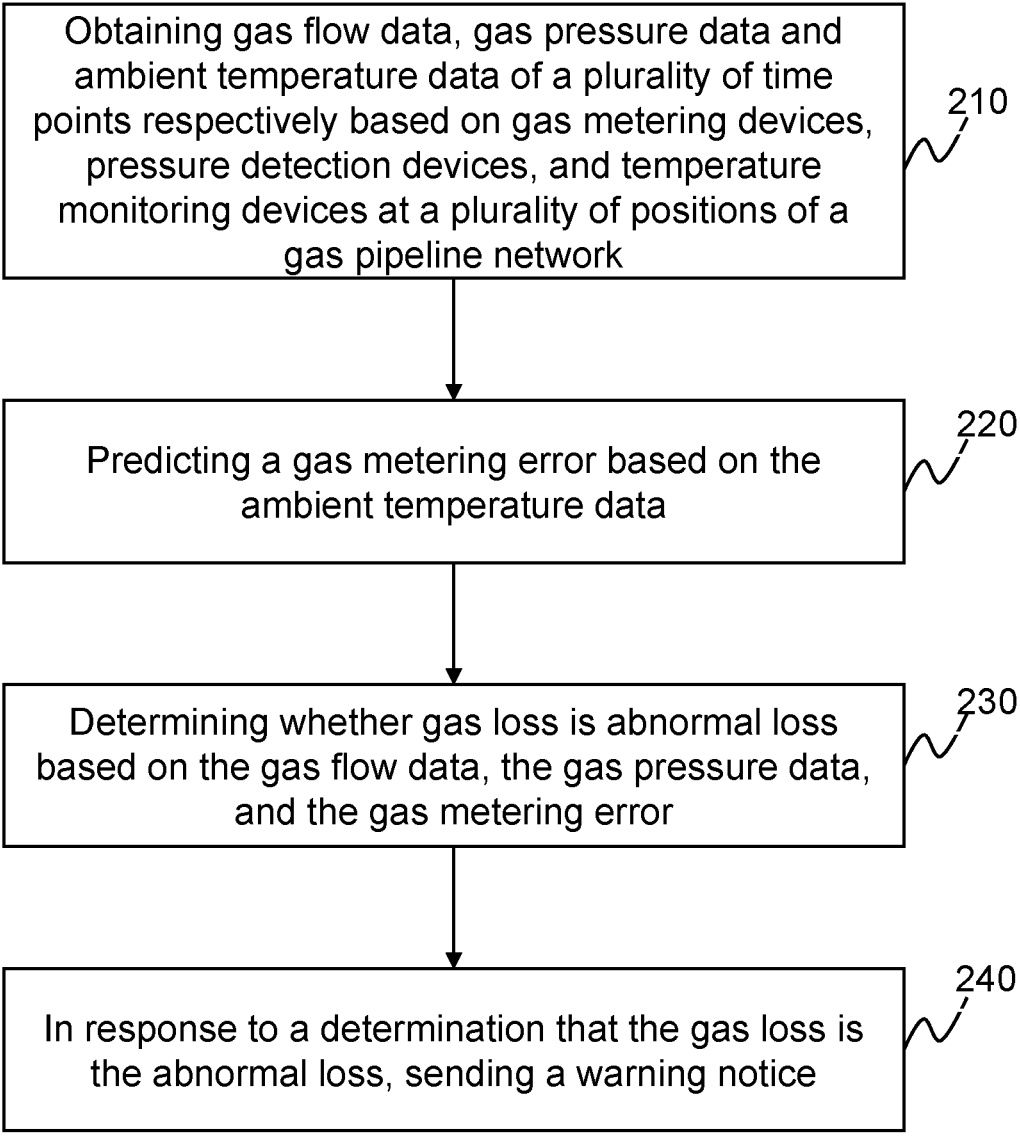
FIG. 2 is a flowchart illustrating an exemplary process of a method for warning abnormal gas transmission loss according to some embodiments of the present disclosure.

FIG. 2 is a flowchart illustrating an exemplary process of a method for warning abnormal gas transmission loss according to some embodiments of the present disclosure. In some embodiments, the process 200 may be performed by a gas equipment management platform. As shown in FIG. 2, the process 200 may include the following operations.

In 210, obtaining gas flow data, gas pressure data and ambient temperature data of a plurality of time points respectively based on gas metering devices, pressure detection devices, and temperature monitoring devices at a plurality of positions of a gas pipeline network.

The gas flow data may refer to an amount of gas flow passing through each metering node of the gas pipeline network. For example, the gas flow data may be the amount of flow passing through a node of a main gas pipeline and a branch of the gas pipeline network. The gas flow data may be expressed in cubic meters per second and cubic meters per minute.

In some embodiments, the gas flow data may be obtained through a gas object platform (e.g., the gas metering device configured at each metering node of the gas pipeline network). The gas metering device may refer to a metering device for measuring the gas flow data. For example, the gas metering device may include but is not limited to a gas meter, a gas flow meter, etc.

The gas pressure data may refer to a gas pressure value at each position of the gas pipeline network. In some embodiments, the gas pressure data may be obtained through the gas object platform (e.g., the pressure detection device configured at each position of the gas pipeline network).

In some embodiments, the pressure detection devices may be configured according to a preset interval based on a detection requirement. For example, one pressure detection device may be configured at an interval of 20 meters, 30 meters, etc. The pressure detection device may refer to a device for measuring gas pressure in the gas pipeline. The pressure detection device may include but is not limited to a U-shaped press, a millibar pressure gauge, a digital pressure gauge, etc.

The ambient temperature data may refer to temperature information of a gas transmission environment. In some embodiments, the ambient temperature data may include ambient temperature outside the pipeline and temperature of the pipeline.

In some embodiments, the ambient temperature data may be obtained through the gas object platform (e.g., the temperature monitoring device configured in the gas pipeline network). The temperature monitoring device may refer to a device for monitoring the ambient temperature data. For example, the temperature monitoring device may include but is not limited to a gas thermometer, a pressure thermometer, a temperature sensor, etc. In some embodiments, different ambient temperature data may be obtained by the different temperature monitoring devices. For example, the temperature of the pipeline may be obtained through the pressure thermometer.

In 220, predicting a gas metering error based on the ambient temperature data.

The gas metering error may refer to a gas flow error caused by different models of gas metering devices, changes in ambient temperature, and pressure changes during the gas flow metering process.

In some embodiments, the gas equipment management platform may predict the gas metering error based on the ambient temperature data. For example, the gas equipment management platform may determine the gas metering error corresponding to different ambient temperatures and different models of gas metering devices through historical temperature data and historical actual historical gas flow collected during the process of gas transmission, gas flow obtained by a historical gas metering device, and a gas metering device model, and may take the gas metering error as the predicted gas metering error. Exemplarily, the corresponding gas metering error may be obtained by performing subtraction on the actual historical gas flow corresponding to the different temperatures and the different models of gas metering devices and the gas flow obtained by the historical gas metering device, and the gas metering error may be taken as the predicted gas metering error.

In some embodiments, the gas equipment management platform may determine the gas metering error by processing the ambient temperature data using an error model. The error model may be a machine learning model. For further description about determining the gas metering error based on the error model, please refer to FIG. 3 and related description thereof.

In 230, determining whether gas loss is abnormal loss based on the gas flow data, the gas pressure data, and the gas metering error.

The gas loss may refer to gas loss generated during the process of gas transmission. For example, the gas loss may include losses due to gas leakage, damage/failure of the gas metering device, gas pressure, gas impurities, etc.

In some embodiments, the gas loss may include normal loss and abnormal loss. The abnormal loss may refer to abnormal gas loss during the process of gas transmission. The abnormal loss may include a difference between theoretical gas flow and actual gas flow caused by damage to the metering device, gas leakage, etc. The normal loss may refer to a gas pressure loss, a gas impurity loss, etc. during the process of gas transmission.

In some embodiments, the gas equipment management platform may determine the gas loss based on the obtained gas flow data of a plurality of nodes (where the metering devices are located) in combination with the gas metering error. For example, the gas equipment management platform may determine the gas loss based on a difference between the gas flow data of a current node and the gas flow data of a parent node in combination with the gas metering error. Exemplarily, the gas equipment management platform may correct the gas flow data of the current node through the gas metering error, and then compare the corrected gas flow data of the current node with the gas flow data of the parent node to determine the gas loss.

In some embodiments, the current node may also be called a child node, i.e., the current node may be the child node of the parent node. In some embodiments, there may be a plurality of current nodes corresponding to the parent node. The gas equipment management platform may respectively determine a gas flow data correction value of each current node, add the gas flow data correction values up, and compare an addition result with the gas flow data of the parent node to determine the gas loss. For example, there may be 3 current nodes corresponding to the parent node. The gas equipment management platform may respectively determine the gas flow data correction values of the three current nodes to be 200 m$^3$/h, 300 m$^3$/h, and 400 m$^3$/h, and add the gas flow data correction values up to obtain a sum of the gas flow of 900 m$^3$/h. The gas flow data of the parent node may be 950 m$^3$/h. By comparing the sum of the gas flow with the gas flow data of the parent node, the gas loss may be 50 m$^3$/h.

In some embodiments, the gas equipment management platform may compare the determined gas loss with a preset loss threshold to determine whether the gas loss is the abnormal loss. The preset loss threshold may be a normal gas loss value, which may be set manually.

In some embodiments, the gas equipment management platform may determine a gas pressure change feature based on the gas pressure data; determine a gas flow difference based on the gas flow data of a plurality of positions in combination with the gas pressure change feature and the gas metering error; and determine whether the gas flow difference satisfies a preset condition, and in response to a determination that the gas flow difference does not satisfy the preset condition, determine that the gas loss is the abnormal loss. For further description about determining whether the gas loss is the abnormal loss, please refer to FIG. 4 and related description thereof.

In some embodiments, the gas equipment management platform may construct a graph structure based on the gas flow data, the gas pressure change feature, the gas metering error, the gas flow difference, and a gas flow difference range; determine whether the gas flow difference satisfies the gas flow difference range based on the graph structure; and in response to a determination that the gas flow difference does not satisfy the gas flow difference range, determine that the gas loss is the abnormal loss.

In some embodiments, the gas equipment management platform may determine whether the gas flow difference satisfies the gas flow difference range by processing the graph structure through a flow model. The flow model may be a machine learning model.

Figure 5:
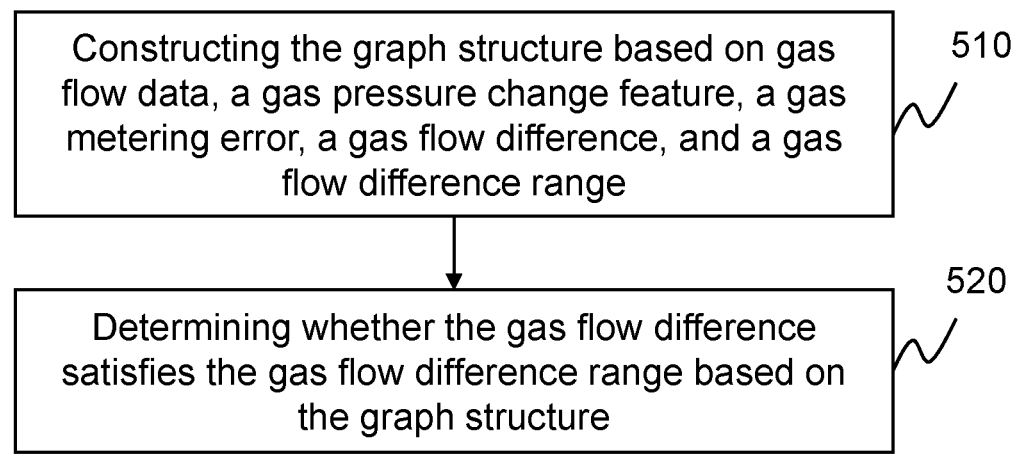
FIG. 5 is a flowchart illustrating an exemplary process for determining whether gas loss is abnormal loss based on a graph structure according to some embodiments of the present disclosure.
Figure 6:
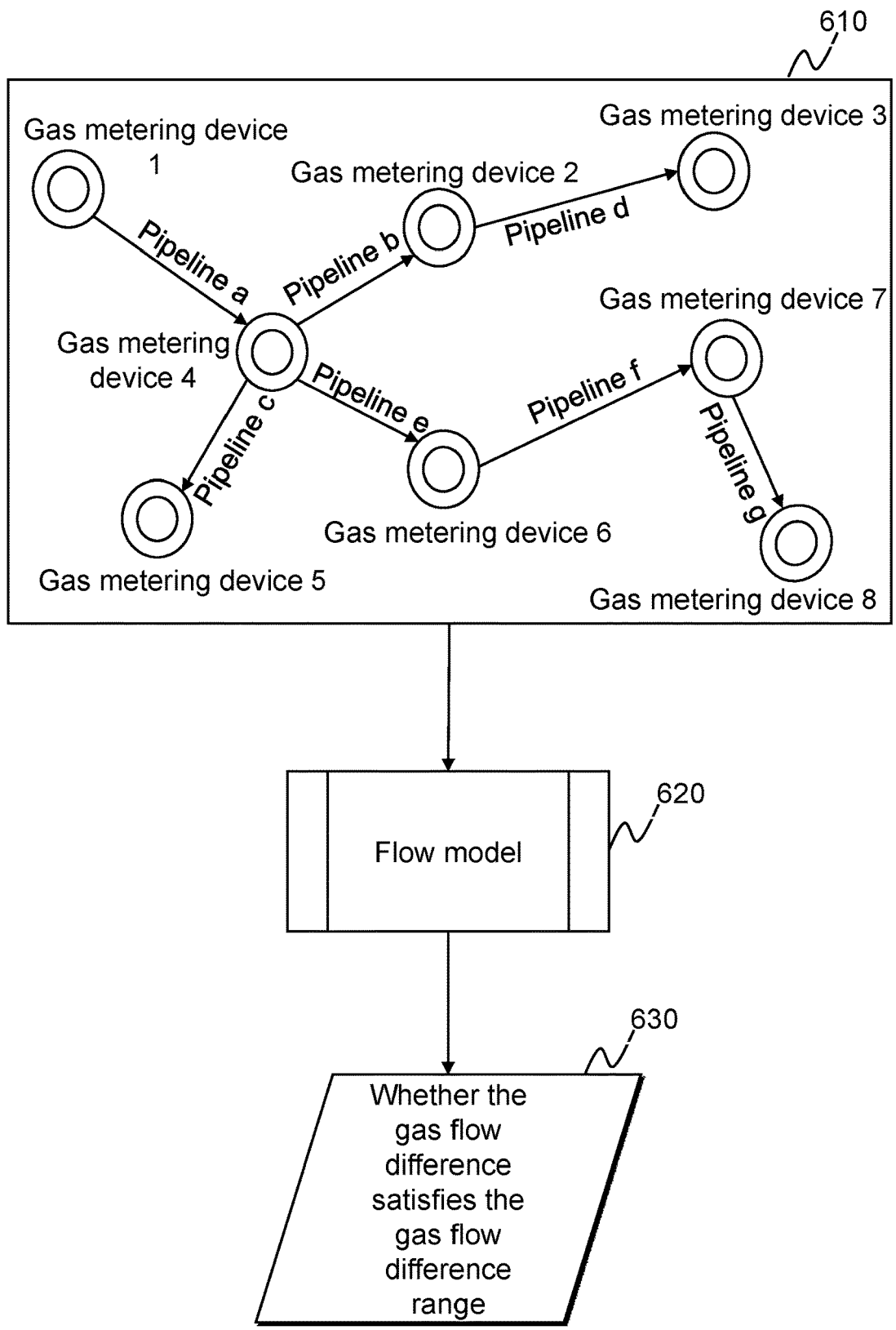
FIG. 6 is a schematic diagram illustrating an exemplary process for determining whether gas loss is abnormal loss based on a flow model according to some embodiments of the present disclosure.

For further description about determining whether the gas loss is the abnormal loss based on the graph structure and the flow model, please refer to FIG. 5 and FIG. 6, and related description thereof.

In 240, in response to a determination that the gas loss is the abnormal loss, sending a warning notice.

The warning notice may refer to a notice sent when the gas loss is the abnormal loss. For example, the warning notice may be a notice sent to a gas supervision user that "the gas loss of a certain position is abnormal, please repair the pipeline and the metering device at this position." As another example, the warning notice may be a notice sent to a gas operation user (government user) that "the gas loss of a certain position is abnormal, please take relevant measures at this position." The relevant measures may refer to temporarily closing a gas valve at the position, notifying for maintenance, etc.

In some embodiments, the gas equipment management platform may send the warning notice in response to a determination that the gas loss is the abnormal loss, and may transmit the warning notice to the gas service platform. The gas service platform may upload the warning notice to the gas user platform to notify the relevant user.

In some embodiments, in response to a determination that the gas loss is the abnormal loss, the gas equipment management platform sending the warning notice may include: determining a warning level based on a position and a size of the abnormal loss.

The position of the abnormal loss may refer to a position of the abnormal loss in the gas pipeline network. For example, the position of the abnormal loss may be a branch of the gas pipeline network, a node of the gas pipeline network, whether the position is close to a key position, etc. The key position may be a main transmission gas pipeline, a residential area, an area with open flames, etc.

The size of the abnormal loss may refer to a size of the abnormal gas loss. For example, the size of the abnormal loss may be 5%, 10%, etc. of a gas transmission volume.

The warning level may refer to a level of performing warning of the abnormal loss. For example, the warning level may be level 1, level 2, and level 3, and level 1>level 2>level 3. As another example, the warning level may be a yellow warning, an orange warning and a red warning, and red warning>orange warning>yellow warning.

In some embodiments, the gas equipment management platform may comprehensively determine the warning level based on the position and the size of the gas loss. In some embodiments, the gas equipment management platform may determine a preliminary warning level based on the position and the size of the gas loss, and then perform weighted summation to determine a final warning level. For example, the gas equipment management platform may first determine a position-based warning level based on the position of the gas loss, then determine a loss-based warning level based on the size of the gas loss, and then perform the weighted summation on the position-based warning level and the loss-based warning level to determine the final warning level. The weight of the weighted summation may be determined according to economic loss and a risk degree caused by the position of the gas loss and the size of the gas loss.

In some embodiments, the gas equipment management platform may determine whether the position is located at the key position or a distance from the key position based on the position of the gas loss, and determine the warning level. If the position of the gas loss is located at the key position, the warning level may be the highest. Accordingly, the farther away from the key position is, the lower the warning level may be. Specifically, the warning levels corresponding to different distance ranges from the key position may be determined by presetting in advance.

In some embodiments, the gas equipment management platform may determine the economic loss and/or the risk degree that may be caused by the size of the gas loss based on the size of the gas loss, and determine the warning level. The larger the gas loss is, the greater the economic loss and the risk degree may be, and the higher the corresponding warning level may be. For example, the gas equipment management platform may calculate the economic loss and the risk degree corresponding to the size of each gas loss in advance, and set a warning level corresponding to the economic loss and the risk degree.

In some embodiments, the gas equipment management platform may send, based on the warning level, a warning notice corresponding to the warning level. For example, if the warning level is the red warning, the gas equipment management platform may send an warning notice to the gas service platform that "the gas loss of a certain position is the abnormal loss, and the warning level is the red warning, please handle it in time," etc.

In some embodiments, the warning notice may also be related to a confidence level of the flow model. When the confidence level is smaller than a confidence level threshold, the warning notice may be added to the confidence level.

The confidence level may refer to credibility of an output result of the flow model. For example, the confidence level may refer to 60%, 70%, 80%, 90%, etc. In some embodiments, the confidence level of the flow model may be determined based on accuracy of the output result of the flow model. In some embodiments, the accuracy of the output result of the flow model may be directly used as the confidence level. For example, a plurality of groups of graph structures constructed based on historical data may be processed using the flow model. The output result may be compared with an actual historical result to determine a ratio of a count of output results that are true to a count of all output results. The ratio may be used as the accuracy of the flow model to determine the confidence level. The historical data may refer to the gas flow data, the gas pressure change feature, the gas metering error, the gas flow difference, and the gas flow difference range of a historical time.

Exemplarily, the gas equipment management platform may process the plurality of groups of graph structures constructed based on the historical data through the flow model, and may output a plurality of processing results. Assuming that a total of 1000 sets of data are processed, 1000 processing results may be obtained. The 1000 processing results may be compared with the actual historical results. A count of processing results that are true may be 900, and the calculated accuracy of the flow model may be 90%, so the confidence level of the flow model may also be 90%.

For further description about the gas flow data, the gas pressure change feature, and the gas metering error, please refer to FIG. 2 and related description thereof. For further description about the gas flow difference, please refer to FIG. 4 and related description thereof. For further description about the gas flow difference range, please refer to FIG. 5 and related description thereof.

The confidence level threshold may refer to a threshold that the confidence level of the flow model needs to satisfy. For example, the confidence level threshold may be 80%. In some embodiments, the confidence level threshold may be manually set.

In some embodiments, when the confidence level of the flow model is smaller than the confidence level threshold, the gas equipment management platform may add the confidence level to the warning notice. For example, if the confidence level is 78%, the confidence level threshold is 80%, and the confidence level is smaller than the confidence level threshold, then the warning notice may be "the confidence level that the gas loss of a certain position is the abnormal loss is 78%, please handle it in time."

In some embodiments, when the confidence level of the flow model is smaller than the confidence level threshold, the gas equipment management platform may appropriately downgrade the corresponding warning level of the warning notice. For example, when the confidence level of the flow model is smaller than the confidence level threshold, the gas equipment management platform may adjust the warning level of the original warning notice from level 1 (or red warning) to level 2 (or orange warning).

In some embodiments of the present disclosure, by determining the warning level of the warning notice based on the position and the size of the gas loss, and considering factors such as the risk degree and the economic loss to the surrounding area caused by the position and the size of the gas loss, a more accurate and scientific warning of gas loss may be provided for the user to take a more realistic measure. Meanwhile, by setting the confidence level for the warning notice, and adding the confidence level to the warning notice when the confidence level is smaller than the confidence level threshold, the user may further formulate a reasonable disposal plan based on the confidence level when determining a way to dispose the abnormal gas loss.

In some embodiments of the present disclosure, the metering error may be determined by collecting the gas-related data in the gas pipeline, the gas flow data may be corrected based on the metering error, and then the corrected gas flow data may be compared with the theoretical gas flow data of the parent node to determine whether the gas loss is the abnormal loss. By eliminating the interference caused by the gas metering error, whether the gas loss is the normal loss or the abnormal loss can be more accurately determined, and the accuracy of predicting the gas transmission loss can be improved.

Figure 3:
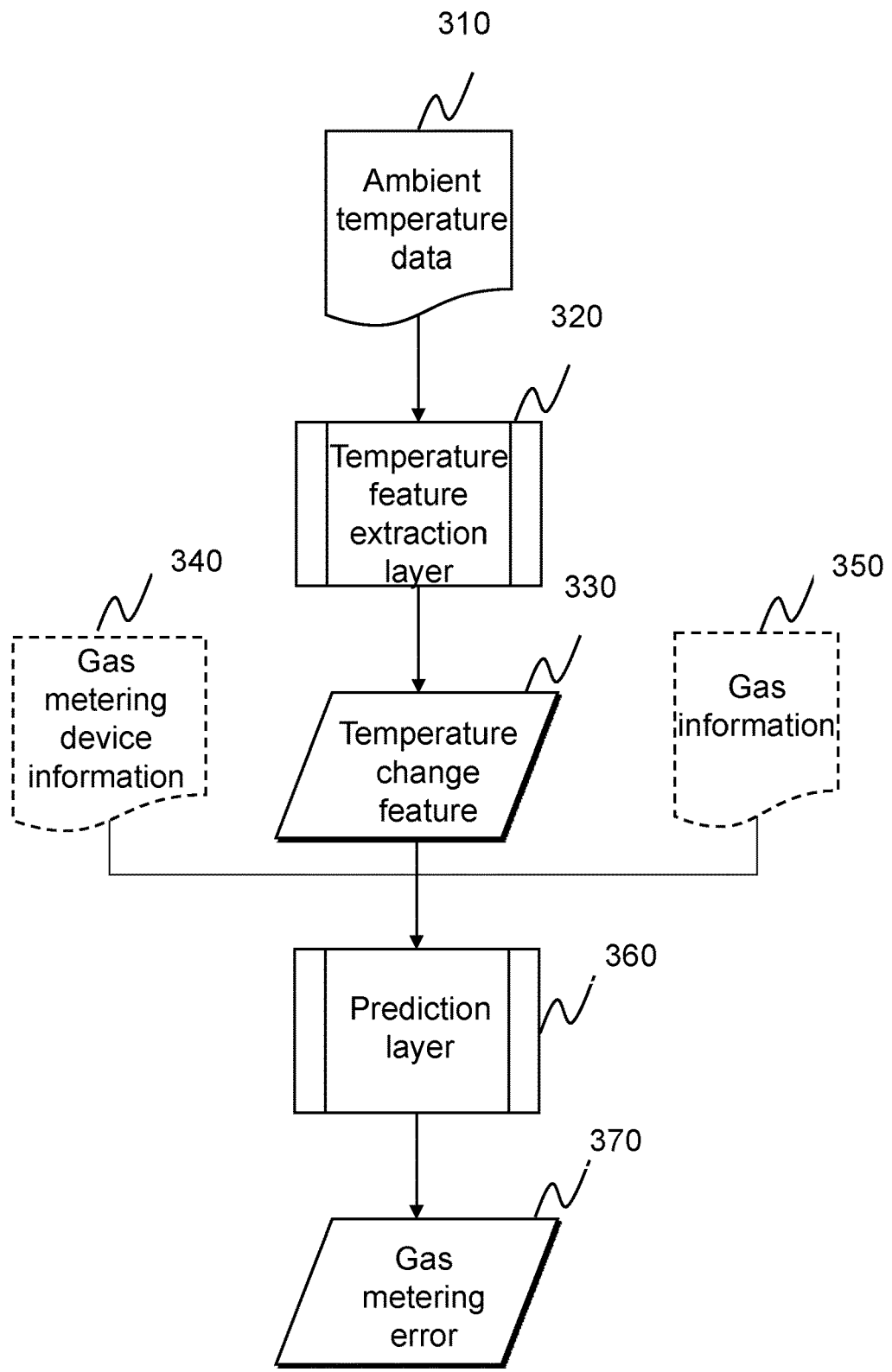
FIG. 3 is an exemplary schematic diagram illustrating determining a metering error based on an error model according to some embodiments of the present disclosure.

FIG. 3 is an exemplary schematic diagram illustrating determining a metering error based on an error model according to some embodiments of the present disclosure.

In some embodiments, a gas equipment management platform predicting the gas metering error based on ambient temperature data may include: determining the gas metering error by processing the ambient temperature data using the error model. The error model may be a machine learning model.

In some embodiments, the error model may include at least one of a convolutional neural networks (CNN) model, a recurrent neural networks (RNN) model, or other custom networks models.

In some embodiments, an input of the error model may be the ambient temperature data, and an output of the error model may be the gas metering error. For further description about the ambient temperature data, please refer to FIG. 2 and related description thereof.

In some embodiments, the error model may be obtained based on training. A first training sample for training the error model may be historically collected ambient temperature data or manually determined temperature data. A first training label may be an actual gas metering error corresponding to the historically collected ambient temperature data. In some embodiments, the first training label may be obtained based on experiments. In some embodiments, a certain amount of gas may be transmitted in a preset experimental pipeline, the ambient temperature data of the experiment may be set as the historically collected ambient temperature data, the gas flow data may be measured by a gas metering device, and the measured value may be compared with a transmission value to determine the gas metering error.

In some embodiments, the gas equipment management platform may input sample ambient temperature data into an initial error model to obtain a sample initial gas metering error. A loss function may be constructed based on the sample initial gas metering error and the first training label, and parameters of the initial error model may be updated based on the loss function. A trained error model may be obtained by updating the parameters.

In some embodiments, the error model may include a temperature feature extraction layer and a prediction layer. The temperature feature extraction layer may be configured to determine a temperature change feature by processing the ambient temperature data. The prediction layer may be configured to determining the gas metering error by processing the temperature change feature.

In some embodiments, the temperature feature extraction layer of the error model may be one of a recurrent neural networks (RNN) model, a long short-term memory networks (LSTM) model, etc. In some embodiments, the prediction layer of the error model may be one of a recurrent neural networks (RNN) model, a convolutional neural networks (CNN) model, other custom networks models, etc.

As shown in FIG. 3, the error model may include the temperature feature extraction layer 320 and the prediction layer 360. The temperature feature extraction layer 320 may be configured to determine the temperature change feature 330 by processing the ambient temperature data 310. The prediction layer 360 may be configured to determine the gas metering error 370 by processing the temperature change feature 330. The temperature change feature 330 may refer to a change of the ambient temperature data, such as a magnitude, speed, etc. of the ambient temperature change.

In some embodiments, the temperature change feature may be temperature change feature of a future period of time. The future of time period may be a period of time after the current time. For example, the temperature change feature may be the temperature change feature of 1 hour, 5 hours, 1 day, 1 week, etc. in the future. In some embodiments, different temperature change magnitudes may correspond to different gas metering errors.

The temperature feature extraction layer may first extract the ambient temperature data, obtain the temperature change feature, and input the temperature change feature into the prediction layer to determine the gas metering error, which can improve the efficiency of data processing.

In some embodiments, an input of the prediction layer 360 may also include gas metering device information 340 and gas information 350. At this time, the prediction layer 360 may process the temperature change feature 330, the gas metering device information 340, and the gas information 350 to determine the gas metering error 370.

The gas metering device information 340 may refer to information related to a gas metering device. For example, the gas metering device information may include a model and brand of the gas metering device. In some embodiments, the gas metering device information may be obtained from factory parameter information of the gas metering device.

The gas information may refer to information related to the gas transmitted in the gas pipeline network. For example, the gas information may include a type and quality of gas. The gas type may include natural gas, artificial gas, liquefied petroleum gas, and biogas. Different gas suppliers or different supply areas may have different gas types. The gas quality may refer to composition of the gas. Different qualities of gas may have different compositions (e.g., methane content). In some embodiments, the gas information may be obtained through the gas supplier.

In some embodiments, the temperature feature extraction layer and the prediction layer of the error model may be obtained through joint training. In some embodiments, a first training sample of the joint training of the temperature feature extraction layer and the prediction layer may be historically collected sample ambient temperature data. A first training label may be an actual gas metering error corresponding to the historically collected sample ambient temperature data. In some embodiments, the first training sample may further include sample gas metering device information and sample gas information. The sample ambient temperature data, the sample gas metering device information, and the sample gas information may be in one-to-one correspondence. That is, in the first training sample, the sample ambient temperature data may be the ambient temperature data of the sample gas corresponding to the sample gas information. The sample gas metering device information may be information related to the gas metering device used to measure the sample gas. The sample gas metering device information and the sample gas information may be mainly used as the input of the prediction layer when the prediction layer is trained.

In some embodiments, the gas equipment management platform may input the sample ambient temperature data in the first training sample into an initial temperature feature extraction layer to obtain an initial sample temperature change feature. The initial sample temperature change feature, the sample gas metering device information, and the sample gas information may be input into an initial prediction layer to obtain an initial sample gas metering error. A loss function may be constructed based on the initial sample gas metering error and the first training label. The initial temperature feature extraction layer and the initial prediction layer may be updated synchronously based on the loss function. A trained temperature feature extraction layer and a trained prediction layer may be obtained through parameter updating.

In some embodiments of the present disclosure, the ambient temperature data may be processed through the error model, and the relationship between the ambient temperature data and the gas metering error may be found in a large amount of data using the self-learning ability of the machine learning model, so as to improve the efficiency and accuracy of predicting the gas metering error. The model and brand of the gas metering device, and the gas quality and type of may be added to the input of the error model, the difference in the gas metering error caused by different brands and models of gas metering devices, and the possible gas metering error caused by different qualities and types of gas may be considered, and various factors that may cause the gas metering error may be more comprehensively considered, thereby improving the accuracy of the output of the model.

Figure 4:
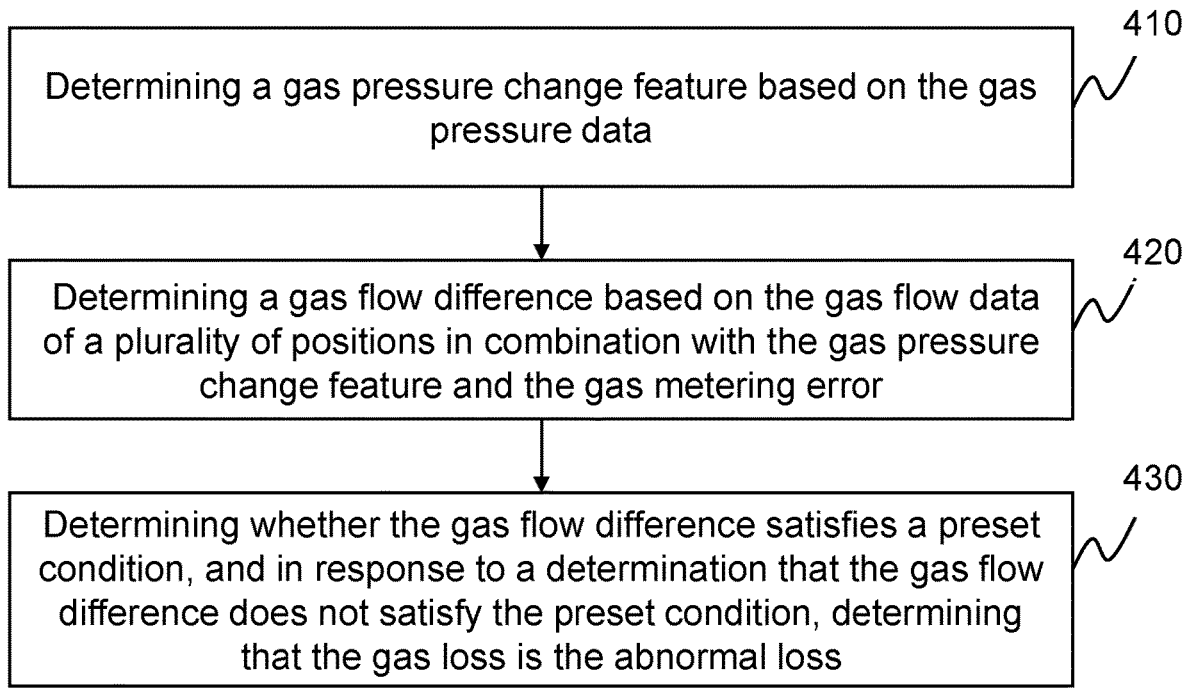
FIG. 4 is a flowchart illustrating an exemplary process for determining whether gas loss is abnormal loss according to some embodiments of the present disclosure.

FIG. 4 is a flowchart illustrating an exemplary process for determining whether the gas loss is abnormal loss according to some embodiments of the present disclosure. In some embodiments, the process 400 may be performed by a gas equipment management platform. As shown in FIG. 4, the process 400 may include the following operations.

In 410, determining a gas pressure change feature based on the gas pressure data.

The gas pressure change feature may refer to data reflecting a gas pressure change. For example, the gas pressure change feature may be a gas pressure change rate, a gas pressure change frequency, and a gas pressure change trend.

In some embodiments, the gas equipment management platform may perform statistical analysis on the gas pressure data to determine the gas pressure change feature. For example, the gas equipment management platform may obtain gas pressure in the gas pressure data at a certain time interval, and then compare the gas pressure at each time interval in turn to determine a feature such as the gas pressure change rate, the gas pressure change frequency, the gas pressure change trend, etc. For further description about the gas pressure data, please refer to FIG. 2 and related description thereof.

In some embodiments, the gas pressure change feature may be obtained through a pressure feature extraction layer.

In some embodiments, the pressure feature extraction layer may be one of a recurrent neural networks (RNN) model, a long short-term memory networks (LSTM) model, a custom networks models, etc.

In some embodiments, the gas equipment management platform may input the gas pressure data into the pressure feature extraction layer, and process the gas pressure data using the pressure feature extraction layer to obtain the gas pressure feature.

In some embodiments, the gas pressure feature extraction layer may be obtained through training. A second training sample for training the pressure feature extraction layer may be a plurality of sets of gas pressure data, which may be historical gas pressure data or manually set pressure data. A second training label may be an actual gas pressure feature corresponding to the second training sample. In some embodiments, the second training label may be obtained by performing statistical analysis on each set of second training samples.

In 420, determining a gas flow difference based on the gas flow data of a plurality of positions in combination with the gas pressure change feature and the gas metering error.

The gas flow difference may refer to a difference in actual gas flow data between different metering nodes, such as the difference in the actual gas flow data between the parent node and the current node (child node).

In some embodiments, the gas equipment management platform may calculate the actual gas flow data of each metering node based on the gas flow data and the gas metering error of a plurality of metering nodes (metering positions), and then compare the actual gas flow data with the gas flow data of the parent node to determine the gas flow difference.

For example, when the gas metering error of a certain metering node is a positive value, the gas equipment management platform may subtract the gas metering error from the gas flow data of the metering node to obtain the actual gas flow data of the metering node. As another example, when the gas metering error of a certain metering node is a negative value, the gas equipment management platform may add an absolute value of the gas metering error to the gas flow data of the metering node to obtain the actual gas flow data of the metering node.

After obtaining the actual gas flow data, the gas equipment management platform may compare the actual gas flow data with the gas flow data of the parent node to determine the gas flow difference. For further description about the gas flow data, please refer to FIG. 2 and related description thereof.

In some embodiments, one parent node may correspond to a plurality of child nodes. For example, the parent node may be located on a main gas pipeline, and may correspond to the plurality of child nodes located on a plurality of branches of the pipeline network. At this time, the gas equipment management platform may add the actual gas flow data of the plurality of child nodes to obtain a sum of the actual gas flow data, and then compare the sum of the actual gas flow data with the gas flow data of the parent node to determine the gas flow difference.

In some embodiments, when the gas is transmitted in the gas pipeline, the metering error of the gas metering device may also be related to the gas pressure change feature. Because gas is easily affected by temperature and pressure, and gas metering must be performed at a certain temperature and pressure, when the gas pressure changes, the gas metering error may occur. Therefore, the gas equipment management platform may further determine a more accurate gas metering error based on the gas pressure change feature, then determine the actual gas flow data based on the gas metering error and the gas flow data, and compare the actual gas flow data with the gas flow data of the parent node to determine the gas flow difference.

In some embodiments, the gas flow data of the parent node may be determined by correcting the gas flow data obtained by the gas metering device through the gas metering error. In some embodiments, the gas flow data of the parent node may also be calculated and obtained through a preset equation. For example, when a rated flow of each gas usage equipment and a count of gas usage equipment are known, the gas flow (calculated flow per hour) may be calculated by the following equation:

$$Q_h = \sum KNQ_n \qquad \text{(Equation 1)}$$

where $Q_h$ denotes the calculated gas flow of a residential user (m³/h); K denotes a simultaneous working coefficient of the gas usage equipment, which may be obtained through a relevant data sheet; N denotes the count of a same type of equipment; and $Q_n$ denotes the rated flow (m³/h) of a single gas usage equipment.

In some embodiments, the gas flow of different users may be calculated in different ways, which is not repeated herein.

In some embodiments, the gas equipment management platform determining the gas flow difference in combination with the gas pressure change feature and the gas metering error based on the gas flow data of a plurality of positions may include: obtaining a gas metering error correction value by correcting the gas metering error based on the gas pressure change feature; and determining the gas flow difference based on the gas flow data of the plurality of positions and the gas metering error correction value.

It should be understood that when gas is not transmitted in the gas pipeline network, the gas metering error of the gas device may be mainly affected by the ambient temperature and a factor such as the gas metering device, etc. When gas is transmitted in the gas pipeline network, the change of gas pressure may also affect the metering accuracy of the gas metering device, resulting in the metering error. Therefore, it is necessary to further correct the gas metering error based on the gas pressure change feature to obtain a more accurate gas metering error.

The gas metering error correction value may refer to a value after the gas metering error is corrected according to the gas pressure change feature.

In some embodiments, the gas equipment management platform may determine the gas metering error caused by the pressure change based on the gas pressure change feature, and then correct the original gas metering error based on the gas metering error caused by the pressure change to determine the gas metering error correction value. For example, the gas metering error correction value may be obtained by adding the gas metering error caused by the pressure change to the gas metering error.

In some embodiments, the gas equipment management platform may determine the gas metering errors caused by different gas pressure change features through experiments. For example, gas may be transmitted in the gas pipeline of the experiment, and then the gas pressure may be changed through a pressure device to collect the gas pressure change feature. Meanwhile, the gas flow data of the gas metering device collected accordingly may be compared with the actual gas flow data to determine a total gas metering error. The gas metering error caused by the gas pressure change may be determined by comparing the total gas metering error with the gas metering error determined by a factor such as the ambient temperature, etc.

In some embodiments, the gas equipment management platform may determine the actual gas flow data using the gas flow data and gas metering error correction value, and then compare the actual gas flow data with the gas flow data of the parent node to determine the gas flow difference. For example, if the gas flow data obtained based on the metering device is 200 m$^3$/h, and the gas metering error correction value is −20 m$^3$/h, the obtained actual gas flow data may be 220 m$^3$/h. If the gas flow data of the parent node is 250 m$^3$/h, the gas flow difference may be 30 m$^3$/h.

In some embodiments of the present disclosure, by determining the gas pressure change feature, and correcting the gas metering error based on the gas pressure change feature, considering the influence of the gas pressure change in the gas pipeline on the accuracy of the gas metering device, a more accurate gas metering error value can be determined, the accuracy of the determined gas flow data can be improved, and the accuracy of the determined gas flow difference can be improved.

In some embodiments, the gas equipment management platform determining the gas flow difference in combination with gas pressure change feature and the gas metering error based on gas flow data of a plurality of positions may include: constructing a graph structure based on the gas flow data, the gas pressure change feature, the gas metering error, the gas flow difference, and a gas flow difference range; and determining whether the gas flow difference satisfies the gas flow difference range based on the graph structure.

In some embodiments, the gas equipment management platform determining whether the gas flow difference satisfies the gas flow difference range based on the graph structure may include: determining whether the gas flow difference satisfies the gas flow difference range by processing the graph structure through a flow model. The flow model may be a machine learning model.

For further description about determining the gas flow difference based on the graph structure and the flow model, please refer to FIG. 5 and FIG. 6 and related description thereof.

In 430, determining whether the gas flow difference satisfies a preset condition, and in response to a determination that the gas flow difference does not satisfy the preset condition, determining that the gas loss is the abnormal loss.

The preset condition may refer to a preset condition, standard, etc. for determining whether the gas loss is the abnormal loss. For example, the preset condition may be that the gas flow difference is smaller than or equal to a difference threshold. As another example, the preset condition may be that the gas flow difference satisfies the gas flow difference range. In some embodiments, the preset condition may be determined based on various methods. For example, the present condition may be determined based on relevant industry standards and regulations of gas transmission. As another example, the preset condition may be determined based on a factor such as a region and environment of gas transmission.

In some embodiments, the gas equipment management platform may compare the gas flow difference with the preset condition to determine whether the gas flow difference satisfies the preset condition, and in response to a determination that the gas flow difference does not satisfy the preset condition, determine that the gas loss is the abnormal loss. For example, the gas equipment management platform may compare the gas flow difference with the difference threshold, and if the gas flow difference is greater than the difference threshold, the gas equipment management platform may determine that the gas loss is the abnormal loss.

In some embodiments of the present disclosure, the actual gas flow data may be determined based on the gas metering error and the gas flow data collected by the gas metering device, and then the actual gas flow data may be compared with the actual gas flow data of the parent node to determine the gas flow difference, which may eliminate the influence of the gas metering error caused by various factors, so that the more accurate gas flow data can be determined, and the accuracy of determining whether the gas loss is the abnormal loss can be improved.

It should be noted that the above description of the process 400 is only for example and illustration, and not intended to limit the scope of the present disclosure. For those skilled in the art, various modifications and changes can be made to the process 400 under the guidance of the present disclosure. However, such modifications and changes are still within the scope of the present disclosure. For example, the process 400 may include determining the gas flow difference based on the gas flow data of a plurality of positions and gas flow data of the parent node.

FIG. 5 is a flowchart illustrating an exemplary process for determining whether gas loss is abnormal loss based on a graph structure according to some embodiments of the present disclosure. In some embodiments, the process 500 may be performed by a gas equipment management platform. As shown in FIG. 5, the process 500 may include the following operations.

In 510, constructing the graph structure based on gas flow data, a gas pressure change feature, a gas metering error, a gas flow difference, and a gas flow difference range.

The gas flow difference range may refer to a preset range for determining whether the gas loss is the abnormal loss. For example, the flow difference range may be that the gas flow difference is smaller than 3% of the gas flow of a parent node.

In some embodiments, the gas flow difference range may be determined based on relevant standards and regulations of a gas transmission industry; and may also be determined based on a region and environmental data of gas transmission.

In some embodiments, the gas flow difference range may be related to a type and quality of gas. Different gas types may have different gas flow difference ranges. If the gas quality is good, the corresponding gas flow difference range may be relatively small.

In some embodiments, the gas flow difference range may also be related to the gas pressure change feature. When the gas pressure changes greatly or frequently, the gas flow difference range may be relatively larger, i.e., tolerance for the gas flow difference may be higher. For description about the gas pressure change feature, please refer to FIG. 4 and related description thereof.

When the gas flow difference range is determined, the gas type and quality, as well as the gas pressure change feature may be considered. When the gas type or quality is different, or the gas pressure changes greatly or frequently, different gas flow difference ranges may be preset respectively, which may be more in line with reality, and avoid occurrence of misjudgment to a certain extent.

The graph structure may refer to a graph configured to reflect a distribution of gas pipeline networks, a distribution of various gas metering devices, and various gas-related data. For example, the graph structure may be configured to reflect the distribution of gas pipeline networks, installation positions of various gas metering devices, and data such as the gas flow data, the gas pressure change feature, the gas metering error, the gas flow difference, the gas flow difference range, etc.

In some embodiments, the gas equipment management platform may take each gas metering device in the gas pipeline network as a node and the gas pipeline as an edge to construct the graph structure based on the gas flow data, the gas pressure change feature, the gas metering error, the gas flow difference, and the gas flow difference range.

FIG. 6 is a schematic diagram illustrating an exemplary process for determining whether the gas loss is abnormal loss based on a flow model according to some embodiments of the present disclosure. As shown in FIG. 6, the nodes of a graph structure 610 may be a plurality of gas metering devices correspondingly installed among gas pipelines, such as a gas metering device 1, a gas metering device 2, a gas metering device 3, . . . , a gas metering device 8, etc. In some embodiments, a node feature may include gas flow data, a gas pressure change feature, a gas metering error, a the gas flow difference range. For further description about the gas flow data, the gas pressure change feature, and the gas metering error, please refer to FIG. 2 and related description thereof.

Continue to refer to FIG. 6, the edges in the graph structure 610 may be gas pipelines in the gas pipeline network, such as a pipeline a, a pipeline b, pipeline c, . . . , a pipeline g, etc. The edge may be a directed edge, which may point in a direction of gas transmission. In some embodiments, an edge feature may include a gas flow difference. The gas flow difference may be determined based on a difference between gas flow data obtained by gas metering devices set at both ends of the pipeline corresponding to each edge.

In some embodiments, the nodes of the graph structure may correspond to a plurality of edges, and each edge may correspond to one gas metering device. For example, when a node is connected by N edges, and the node is configured with N gas metering devices, the N gas metering devices may correspond to the N edges respectively, and may be configured to detect the gas flow data of the edge corresponding to each gas metering device.

It should be understood that the graph structure 610 shown in FIG. 6 is only for the purpose of illustration, and not intended to limit the scope of the present disclosure. In fact, the graph structure may be constructed based on the entire gas transmission region, or the distribution of gas pipeline networks and gas metering devices in different gas transmission regions.

In 520, determining whether the gas flow difference satisfies the gas flow difference range based on the graph structure.

In some embodiments, the gas equipment management platform may determine whether the gas flow difference of each edge in the graph structure 610 satisfies the gas flow difference range based on the graph structure 610. For example, the gas equipment management platform may determine the gas flow difference of an edge (e.g., a pipeline f) based on the graph structure 610, and may determine whether the gas flow difference of the pipeline f satisfies the gas flow difference range.

In some embodiments, the gas equipment management platform determining whether the gas flow difference satisfies the gas flow difference range based on the graph structure may include: determining whether the gas flow difference satisfies the gas flow difference range by processing the graph structure through a flow model. The flow model may be a machine learning model.

In some embodiments, the flow model may include at least one of a graph neural networks (GNN) model, other custom networks models.

In some embodiments, as shown in FIG. 6, an input of the flow model 620 may be the graph structure 610. An output of the flow model 620 may be whether the gas flow difference corresponding to each edge satisfies the gas flow difference range 630. In some embodiments, the flow model 620 may process the graph structure 610, determine a gas flow difference prediction value corresponding to each edge, and then update the gas flow difference corresponding each edge in the graph structure. Further, the flow model 620 may determine whether the gas flow difference prediction value corresponding to each edge in the graph structure satisfies the gas flow difference range.

In some embodiments, the flow model 620 may be obtained through training.

In some embodiments, a third training sample for training the flow model 620 may be a plurality of graph structures constructed based on a plurality of historical data. The historical data may refer to historical gas flow data, a historical gas pressure change feature, a historical gas metering error, a historical gas flow difference, and a historical gas flow difference range. The historical gas flow difference range may be determined based on other data in the historical data. The historical gas flow data may be obtained through the gas metering device configured in the gas pipeline network. The historical gas pressure change feature may be determined based on the historical gas pressure data. The specific determination manner may refer to FIG. 4 and related description thereof. The historical gas metering error may be determined based on a factor such as historical ambient temperature data, the historical gas pressure change feature, etc. The specific determination manner may refer to FIG. 3 and FIG. 4 and related description thereof. The historical gas flow difference may be determined based on a difference between the historical gas flow data obtained by the gas metering devices set at both ends of the gas pipeline.

In some embodiments, a third training label for training the flow model 620 may be an actual historical gas flow difference corresponding to each set of third training samples and a result of whether the gas flow difference satisfies the gas flow difference range. The result of whether the gas flow difference satisfies the gas flow difference range may be represented by 0 or 1. In some embodiments, the actual historical gas flow difference may be determined by a difference between the actual historical gas flow of both ends of each edge in the third training sample.

In some embodiments, the gas equipment management platform may determine the result of whether the gas flow difference satisfies the gas flow difference range is 0 or 1 based on the actual historical gas flow difference in the third training sample and a preset historical gas flow difference range. For example, the gas equipment management platform may compare the historical gas flow difference with the preset historical gas flow difference range to determine whether the historical gas flow difference satisfies the historical gas flow difference range. If the historical gas flow difference satisfies the historical gas flow difference range, the corresponding result of whether the gas flow difference satisfies the gas flow difference range may be 1. If the historical gas flow difference does not satisfy the historical gas flow difference range, the corresponding result of whether the gas flow difference satisfies the gas flow difference range may be 0.

In some embodiments, the gas equipment management platform may also perform manual labeling based on the actual data to determine whether the historical gas flow difference satisfies the historical gas flow difference range. For example, if a certain edge in the third training sample fails or leaks, etc., a prediction result corresponding to the edge may be labelled as 0, which may be used as a training label.

In some embodiments, the gas equipment management platform may input the third training sample into an initial flow model to obtain an initial prediction result. A loss function may be constructed based on the initial prediction result and the third training label. Parameters of the initial flow model may be updated based on the loss function. A trained flow model may be obtained through parameter updating.

In some embodiments of the present disclosure, by constructing the graph structure to represent the distribution of gas pipelines, the distribution of gas metering devices, and various gas-related data, the data may be represented more intuitively, which may establish a basis for further analysis. The graph structure may be processed using the flow model to determine whether the gas flow difference satisfies the gas flow difference range. The law may be found in a large amount of gas data using the self-learning ability of the machine learning model to quickly and accurately determine whether the gas flow difference of each edge in the graph structure is within the preset gas flow difference range, so as to find an abnormal position of the gas flow difference in time, and fully meet the needs of gas operation and supervision.

It should be noted that the above description of the process 500 is only for illustration and description, and not intended to limit the scope of the present disclosure. For those skilled in the art, various modifications and changes can be made to the process 500 under the guidance of the present disclosure. However, such modifications and changes are still within the scope of the present disclosure. One of the embodiments of the present disclosure also provides a non-transitory computer-readable storage medium storing computer instructions. When reading the computer instructions in the storage medium, the computer may execute the method for warning the abnormal gas transmission loss as described in the embodiments of the present disclosure.

The beneficial effects of the embodiments of the present disclosure may include but are not limited to: (1) by obtaining the gas-related data in the gas pipeline, the metering error can be determined, correcting the gas flow data based on the metering error, comparing the corrected gas flow data with the theoretical gas flow data of the parent node, determining whether the gas loss is the abnormal loss, the interference caused by the gas metering error can be eliminated, whether the gas loss is the normal loss or the abnormal loss can be more accurately determined, and the accuracy of predicting the gas transmission loss can be improved; (2) by processing the ambient temperature data through the error model, the relationship between the ambient temperature data and the gas metering error may be found in a large amount of data using the self-learning ability of the machine learning model, thereby improving the efficiency and accuracy of predicting the gas metering error. The model and brand of the gas metering device, the quality and type of gas may be added to the input of the error model, the differences in gas metering errors caused by different brands and models of gas metering devices, and the possible gas error caused by different qualities and types of gas may be considered, so that various factors that may cause the gas metering error can be more comprehensively considered, and the accuracy of the output of the model can be improved; (3) by constructing the graph structure to represent the distribution of gas pipelines, the distribution of gas metering devices, and various gas-related data, the data can be represented more intuitively. The graph structure may be processed using the flow model to determine whether the gas flow difference satisfies the gas flow difference range, and the law may be found in a large amount of gas-related data using the self-learning ability of the machine learning model, thereby improving the efficiency and accuracy of data processing.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or characteristics in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." "About," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, the embodiments of the present disclosure are not limited to that precisely as shown and described.

What is claimed is:

1. A method for warning abnormal gas transmission loss, implemented by a gas equipment management platform of an Internet of Things (IoT) system for warning abnormal gas transmission loss, wherein the IoT system for warning the abnormal gas transmission loss further comprises a gas user platform, a gas service platform, a gas sensor network platform, and a gas object platform; and the gas object platform is configured as at least one of gas metering devices, pressure detection devices, and temperature monitoring devices, and the method comprises:

obtaining gas flow data, gas pressure data, and ambient temperature data of a plurality of time points respectively through the gas sensor network platform based on the gas metering devices, the pressure detection devices, and the temperature monitoring devices at a plurality of positions of a gas pipeline network;

determining a gas metering error by processing the ambient temperature data, gas metering device information, and gas information using an error model, wherein the error model is a trained machine learning model, the error model includes a temperature feature extraction layer and a prediction layer, the temperature feature extraction layer is configured to determine a temperature change feature by processing the ambient temperature data, the prediction layer is configured to determine the gas metering error by processing the temperature change feature, the gas metering device information, and the gas information, the temperature feature extraction layer is one of recurrent neural networks (RNN) and long short-term memory networks (LSTM), and the prediction layer is one of the RNN, convolutional neural networks (CNN), or other custom networks;

determining whether gas loss is abnormal loss based on the gas flow data, the gas pressure data, and the gas metering error;

in response to a determination that the gas loss is the abnormal loss, determining a warning level based on a position and a size of the abnormal loss; and determining, based on the warning level, a warning notice corresponding to the warning level, and sending the warning notice to the gas user platform through the gas service platform to send a warning to a user.

2. The method of claim 1, wherein the determining whether gas loss is abnormal loss based on the gas flow data, the gas pressure data, and the gas metering error includes:

determining a gas pressure change feature through a pressure feature extraction layer based on the gas pressure data;

obtaining a gas metering error correction value by correcting the gas metering error based on the gas pressure change feature;

determining a gas flow difference based on the gas flow data of the plurality of positions and the gas metering error correction value; and determining whether the gas flow difference satisfies a preset condition, and in response to a determination that the gas flow difference does not satisfy the preset condition, determining that the gas loss is the abnormal loss, the preset condition including the gas flow difference being smaller than or equal to a difference threshold.

3. The method of claim 1, wherein the determining whether gas loss is abnormal loss based on the gas flow data, the gas pressure data, and the gas metering error includes:
determining a gas flow difference prediction value by processing a graph structure based on a flow model, the flow model being a machine learning model; wherein the graph structure is configured to reflect a distribution of the gas pipeline network, installation positions of the gas metering devices, the gas flow data, a gas pressure change feature, a gas metering error, a gas flow difference, and a gas flow difference range; the graph structures takes each gas metering device between the gas pipeline networks as a note and a gas pipeline as an edge; a node feature includes the gas flow data, the gas pressure change feature, the gas metering error, and the gas flow difference range, and an edge features includes the gas flow difference; and an output of the flow model is the gas flow difference prediction value corresponding to each edge in the graph structure;
updating the gas flow difference corresponding to each edge in the graph structure based on the gas flow difference prediction value;
determining whether the gas flow difference prediction value corresponding to each edge in the graph structure satisfies the gas flow difference range; and
in response to a determination that the gas flow difference prediction value corresponding to each edge in the graph structure does not satisfy the gas flow difference range, determining that the gas loss is the abnormal loss.

4. The method of claim 3, wherein the gas flow difference range is determined based on at least one of a type and quality of gas or the gas pressure change feature.

5. The method of claim 1, wherein joint training of the temperature feature extraction layer and the prediction layer of the error model includes:
inputting sample ambient temperature data into an initial temperature feature extraction layer to obtain a sample initial temperature change feature;
inputting the sample initial temperature change feature, sample gas metering device information, and sample gas information into an initial prediction layer to obtain a sample initial gas metering error; and
constructing a loss function based on the sample initial gas metering error and training labels corresponding to a set of training samples, the training labels being historical actual gas metering errors corresponding to the sample ambient temperature data, and synchronously updating parameters of the initial temperature feature extraction layer and the initial prediction layer based on the loss function to obtain a trained temperature feature extraction layer and a trained prediction layer.

6. The method of claim 1, wherein the warning notice is related to a confidence level of the flow model, and the method further comprise:
when the confidence level of the flow model is smaller than a confidence level threshold, the confidence level is added to the warning notice and/or the warning level corresponding to the warning notice is downgraded.

7. The method of claim 1, wherein
the gas user platform includes a plurality of gas user sub-platforms;
the gas service platform includes a plurality of gas service sub-platforms, and the different gas service sub-platforms correspond to the different gas user sub-platforms;

the gas equipment management platform includes a gas indoor equipment management sub-platform, a gas pipeline network equipment management sub-platform, and a gas data center;
the gas sensor network platform includes a gas indoor equipment sensor network sub-platform and a gas pipeline network equipment sensor network sub-platform, the gas indoor equipment sensor network sub-platform corresponds to the gas indoor equipment management sub-platform, and the gas pipeline network equipment sensor network sub-platform corresponds to the gas pipeline network equipment management sub-platform;
the gas object platform includes a gas indoor equipment object sub-platform and a gas pipeline network equipment object sub-platform, the gas indoor equipment object sub-platform corresponds to the gas indoor equipment sensor network sub-platform, and the gas pipeline network equipment object sub-platform corresponds to the gas pipeline network equipment sensor network sub-platform;
the gas flow data, the gas pressure data, and the ambient temperature data are obtained based on the gas object platform, and are uploaded to the gas data center of the gas equipment management platform based on the gas sensor network sub-platform corresponding to the gas object platform; and
the method includes:
different gas equipment management sub-platforms obtaining data uploaded by the gas sensor network sub-platforms corresponding to the different gas equipment management sub-platforms from the gas data center and determining whether the gas loss is the abnormal loss; and
in response to a determination that the gas loss is the abnormal loss, transmitting the warning notice to the gas service platform through the gas data center, and the gas service platform uploading the warning notice to the gas user platform.

8. A non-transitory computer-readable storage medium storing computer instructions, wherein when reading the computer instructions in the storage medium, a computer executes the method for warning the abnormal gas transmission loss of claim 1.

9. An Internet of Things (IoT) system for warning abnormal gas transmission loss, comprising a gas equipment management platform, a gas user platform, a gas service platform, a gas sensor network platform, and a gas object platform; and the gas object platform is configured as at least one of gas metering devices, pressure detection devices, and temperature monitoring devices, and the gas equipment management platform is configured to:
obtain gas flow data, gas pressure data, and ambient temperature data of a plurality of time points respectively through the gas sensor network platform based on the gas metering devices, the pressure detection devices, and the temperature monitoring devices at a plurality of positions of a gas pipeline network;
determine a gas metering error by processing the ambient temperature data, gas metering device information, and gas information using an error model, wherein the error model is a trained machine learning model, the error model includes a temperature feature extraction layer and a prediction layer, the temperature feature extraction layer is configured to determine a temperature change feature by processing the ambient temperature data, the prediction layer is configured to determine the gas metering error by processing the temperature change feature, the gas metering device information, and the gas information, the temperature feature extraction layer is one of recurrent neural networks (RNN) and long short-term memory networks (LSTM), and the prediction layer is one of the RNN, convolutional neural networks (CNN), or other custom networks;

determine whether gas loss is abnormal loss based on the gas flow data, the gas pressure data, and the gas metering error;

in response to a determination that the gas loss is the abnormal loss, determine a warning level based on a position and a size of the abnormal loss; and determine, based on the warning level, a warning notice corresponding to the warning level, and send the warning notice to the gas user platform through the gas service platform to send a warning to a user.

10. The IoT system of claim 9, wherein the gas equipment management platform is further configured to:

determine a gas pressure change feature through a pressure feature extraction layer based on the gas pressure data;

obtain a gas metering error correction value by correcting the gas metering error based on the gas pressure change feature;

determine a gas flow difference based on the gas flow data of the plurality of positions and the gas metering error correction value; and determine whether the gas flow difference satisfies a preset condition, and in response to a determination that the gas flow difference does not satisfy the preset condition, determine that the gas loss is the abnormal loss, the preset condition including the gas flow difference being smaller than or equal to a difference threshold.

11. The IoT system of claim 9, wherein the gas equipment management platform is further configured to:

determine a gas flow difference prediction value by processing a graph structure based on a flow model, the flow model being a machine learning model; wherein the graph structure is configured to reflect a distribution of the gas pipeline network, installation positions of the gas metering devices, the gas flow data, a gas pressure change feature, a gas metering error, a gas flow difference, and a gas flow difference range; the graph structures takes each gas metering device between the gas pipeline networks as a note and a gas pipeline as an edge; a node feature includes the gas flow data, the gas pressure change feature, the gas metering error, and the gas flow difference range, and an edge features includes the gas flow difference; and an output of the flow model is the gas flow difference prediction value corresponding to each edge in the graph structure;

update the gas flow difference corresponding to each edge in the graph structure based on the gas flow difference prediction value;

determine whether the gas flow difference prediction value corresponding to each edge in the graph structure satisfies the gas flow difference range; and in response to a determination that the gas flow difference prediction value corresponding to each edge in the graph structure does not satisfy the gas flow difference range, determine that the gas loss is the abnormal loss.

12. The IoT system of claim 11, wherein the gas flow difference range is determined based on at least one of a type and quality of gas or the gas pressure change feature.

13. The IoT system of claim 9, wherein the gas equipment management platform is further configured to joint train the temperature feature extraction layer and the prediction layer of the error model, including:

inputting sample ambient temperature data into an initial temperature feature extraction layer to obtain a sample initial temperature change feature;

inputting the sample initial temperature change feature, sample gas metering device information, and sample gas information into an initial prediction layer to obtain a sample initial gas metering error; and constructing a loss function based on the sample initial gas metering error and training labels corresponding to a set of training samples, the training labels being historical actual gas metering errors corresponding to the sample ambient temperature data, and synchronously updating parameters of the initial temperature feature extraction layer and the initial prediction layer based on the loss function to obtain a trained temperature feature extraction layer and a trained prediction layer.

14. The IoT system of claim 9, wherein the warning notice is related to a confidence level of the flow model, and the gas equipment management platform is further configured to:

when the confidence level of the flow model is smaller than a confidence level threshold, the confidence level is added to the warning notice and/or the warning level corresponding to the warning notice is downgraded.

15. The IoT system of claim 9, wherein the gas user platform includes a plurality of gas user sub-platforms;

the gas service platform includes a plurality of gas service sub-platforms, and the different gas service sub-platforms correspond to the different gas user sub-platforms;

the gas equipment management platform includes a gas indoor equipment management sub-platform, a gas pipeline network equipment management sub-platform, and a gas data center;

the gas sensor network platform includes a gas indoor equipment sensor network sub-platform and a gas pipeline network equipment sensor network sub-platform, the gas indoor equipment sensor network sub-platform corresponds to the gas indoor equipment management sub-platform, and the gas pipeline network equipment sensor network sub-platform corresponds to the gas pipeline network equipment management sub-platform;

the gas object platform includes a gas indoor equipment object sub-platform and a gas pipeline network equipment object sub-platform, the gas indoor equipment object sub-platform corresponds to the gas indoor equipment sensor network sub-platform, and the gas pipeline network equipment object sub-platform corresponds to the gas pipeline network equipment sensor network sub-platform;

the gas flow data, the gas pressure data, and the ambient temperature data are obtained based on the gas object platform, and are uploaded to the gas data center of the gas equipment management platform based on the gas sensor network sub-platform corresponding to the gas object platform; and the method includes:

different gas equipment management sub-platforms obtaining data uploaded by the gas sensor network sub-platforms corresponding to the different gas equipment management sub-platforms from the gas data center and determining whether the gas loss is the abnormal loss; and in response to a determination that the gas loss is the abnormal loss, transmitting the warning notice to the gas service platform through the gas data center, and the gas service platform uploading the warning notice to the gas user platform.

\* \* \* \* \*